(12) United States Patent
Colglazier (10) Patent No.: US 10,387,330 B1
(45) Date of Patent: Aug. 20, 2019

(54) LESS RECENTLY AND FREQUENTLY USED (LRAFU) CACHE REPLACEMENT POLICY

(71) Applicant: LENOVO Enterprise Solutions (Singapore) PTE. LTD., New Tech Park (SG)

(72) Inventor: Daniel J. Colglazier, Cary, NC (US)

(73) Assignee: LENOVO ENTERPRISE SOLUTIONS (SINGAPORE) PTE. LTD, Singapore (SG)

( * ) Notice: Subject to any disclaimer, the term of this patent is extended or adjusted under 35 U.S.C. 154(b) by 0 days.

(21) Appl. No.: 15/967,361

(22) Filed: Apr. 30, 2018

(51) Int. Cl.
*G06F 12/00* (2006.01)
*G06F 12/122* (2016.01)
*G06F 12/123* (2016.01)

(52) U.S. Cl.
CPC .......... *G06F 12/122* (2013.01); *G06F 12/123* (2013.01); *G06F 2212/1021* (2013.01)

(58) Field of Classification Search
CPC .................. G06F 12/122; G06F 12/123; G06F 2212/1021
See application file for complete search history.

(56) References Cited

U.S. PATENT DOCUMENTS

| | | | | |
|---|---|---|---|---|
| 9,213,647 | B2 * | 12/2015 | Goodman | G06F 12/0891 |
| 2010/0011168 | A1 * | 1/2010 | Ryu | G06F 12/0804 711/135 |
| 2011/0225369 | A1 * | 9/2011 | Park | G06F 12/0846 711/131 |
| 2013/0046920 | A1 * | 2/2013 | Ryu | G06F 12/0246 711/103 |

* cited by examiner

*Primary Examiner* — Matthew Bradley
(74) *Attorney, Agent, or Firm* — Kunzler Bean & Adamson; Bruce R. Needham (57) ABSTRACT

Apparatuses, systems, methods, and program products are disclosed for cache replacement. An apparatus includes a cache memory structure, a processor, and memory that stores code executable by the processor. The code is executable by the processor to receive a value to be stored in the cache memory structure, identify, in response to determining that the received value is not currently stored in an entry of the cache memory structure, a least recently used ("LRU") set of entries of the cache memory structure where the received value can be stored, and select a least frequently used ("LFU") entry of the identified LRU set of entries for storing the received value.

20 Claims, 6 Drawing Sheets

LESS RECENTLY AND FREQUENTLY USED (LRAFU) CACHE REPLACEMENT POLICY

FIELD

The subject matter disclosed herein relates to cache management and more particularly relates to cache replacement based on tracking least recently used and least frequently used cache entries.

BACKGROUND

Different workloads may perform better using different cache replacement policies. Systems conventionally only have one cache replacement policy installed or enabled. Thus, a workload may not perform well using the particular cache replacement policy enabled on the system that the workload is running on.

BRIEF SUMMARY

An apparatus for cache replacement is disclosed. A method and computer program product also perform the functions of the apparatus.

An apparatus includes a cache memory structure, a processor, and memory that stores code executable by the processor. The code is executable by the processor to receive a value to be stored in the cache memory structure. The code is executable by the processor to identify, in response to determining that the received value is not currently stored in an entry of the cache memory structure, a least recently used ("LRU") set of entries of the cache memory structure where the received value can be stored. The LRU set of entries is identified based on a recentness value that indicates which of a plurality of predefined sets of entries for the cache memory structure is the least recently used. The code is executable by the processor to select a least frequently used ("LFU") entry of the identified LRU set of entries for storing the received value. The LFU entry may be selected based on a usage frequency count for the entries of the identified LRU set of entries. The usage frequency count may indicate which entry of the identified LRU set of entries is the least frequently used.

A method includes receiving, by a processor, a value to be stored in the cache memory structure. The method includes identifying, in response to determining that the received value is not currently stored in an entry of the cache memory structure, a least recently used ("LRU") set of entries of the cache memory structure where the received value can be stored. The LRU set of entries is identified based on a recentness value that indicates which of a plurality of predefined sets of entries for the cache memory structure is the least recently used. The method includes selecting a least frequently used ("LFU") entry of the identified LRU set of entries for storing the received value. The LFU entry may be selected based on a usage frequency count for the entries of the identified LRU set of entries. The usage frequency count may indicate which entry of the identified LRU set of entries is the least frequently used.

A computer program product includes a computer readable storage medium that stores code executable by a processor. The executable code includes code to perform receiving a value to be stored in a cache memory structure. The executable code includes code to perform identifying, in response to determining that the received value is not currently stored in an entry of the cache memory structure, a least recently used ("LRU") set of entries of the cache memory structure where the received value can be stored. The LRU set of entries is identified based on a recentness value that indicates which of a plurality of predefined sets of entries for the cache memory structure is the least recently used. The executable code includes code to perform selecting a least frequently used ("LFU") entry of the identified LRU set of entries for storing the received value. The LFU entry may be selected based on a usage frequency count for the entries of the identified LRU set of entries. The usage frequency count may indicate which entry of the identified LRU set of entries is the least frequently used.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus includes a cache memory structure, a processor, and memory that stores code executable by the processor. The code is executable by the processor to receive a value to be stored in the cache memory structure. The code is executable by the processor to identify, in response to determining that the received value is not currently stored in an entry of the cache memory structure, a least recently used ("LRU") set of entries of the cache memory structure where the received value can be stored. The LRU set of entries is identified based on a recentness value that indicates which of a plurality of predefined sets of entries for the cache memory structure is the least recently used. The code is executable by the processor to select a least frequently used ("LFU") entry of the identified LRU set of entries for storing the received value. The LFU entry may be selected based on a usage frequency count for the entries of the identified LRU set of entries. The usage frequency count may indicate which entry of the identified LRU set of entries is the least frequently used.

In one embodiment, each of the plurality of predefined sets of entries for the cache memory structure is represented by one or more LRU bits. The recentness value may include the one or more LRU bits that represent the identified LRU set of entries. In further embodiments, the code is further executable by the processor to update the one or more LRU bits that include the recentness value to identify a new LRU set of entries in response to storing the received value. In one embodiment, the code is further executable by the processor to update the one or more LRU bits that include the recentness value to identify a new LRU set replacement order in response to an entry outside of the current most recently used ("MRU") set of entries being accessed.

In certain embodiments, the usage frequency count for each entry of the plurality of predefined sets of entries includes one or more LFU bits indicating which entry for each set of entries is the LFU entry. In further embodiments, the code is further executable by the processor to update the one or more LFU bits of the usage frequency count for the identified LRU set of entries in response to storing the received value in the LFU entry such that the value of the one or more LFU bits corresponds to the LFU entry of the LRU set of entries. In various embodiments, the code is further executable by the processor to set the usage frequency count for the identified LRU set of entries to a bit value that identifies the entry where the received value is stored as a most frequently used ("MFU") entry and one or more other entries where the received value is not stored as LFU entries.

In one embodiment, the code is further executable by the processor to set, in response to determining that the received value is currently stored in an entry of the cache memory structure, the usage frequency count for a set of entries where the currently stored value is stored to a value that corresponds to how often the currently stored entry is accessed relative to one or more other entries of the set of entries. In some embodiments, each of the plurality of predefined sets of entries includes a pair of entries for storing values in the cache memory structure.

In one embodiment, the code is further executable by the processor to randomly select entries of the cache memory structure for generating each of the plurality of predefined sets of entries or sequentially select entries of the cache memory structure for generating each of the plurality of predefined sets of entries. In further embodiments, the entries for each of the plurality of predefined sets of entries includes memory addresses for the cache memory structure.

A method includes receiving, by a processor, a value to be stored in the cache memory structure. The method includes identifying, in response to determining that the received value is not currently stored in an entry of the cache memory structure, a least recently used ("LRU") set of entries of the cache memory structure where the received value can be stored. The LRU set of entries is identified based on a recentness value that indicates which of a plurality of predefined sets of entries for the cache memory structure is the least recently used. The method includes selecting a least frequently used ("LFU") entry of the identified LRU set of entries for storing the received value. The LFU entry may be selected based on a usage frequency count for the entries of the identified LRU set of entries. The usage frequency count may indicate which entry of the identified LRU set of entries is the least frequently used.

In one embodiment, each of the plurality of predefined sets of entries for the cache memory structure is represented by one or more LRU bits. The recentness value may include the one or more LRU bits that represent the identified LRU set of entries. In various embodiments, the method includes updating the one or more LRU bits that include the recentness value to identify a new LRU set of entries in response to storing the received value. In further embodiments, the method includes updating the one or more LRU bits that include the recentness value to identify a new LRU set replacement order in response to an entry outside of the current most recently used ("MRU") set of entries being accessed.

In some embodiments, the usage frequency count for each entry of the plurality of predefined sets of entries includes one or more LFU bits indicating which entry for each set of entries is the LFU entry. In various embodiments, the method includes updating the one or more LFU bits of the usage frequency count for the identified LRU set of entries in response to storing the received value in the LFU entry such that the value of the one or more LFU bits corresponds to the LFU entry of the LRU set of entries.

In one embodiment, the method includes setting the usage frequency count for the identified LRU set of entries to a bit value that identifies the entry where the received value is stored as a most frequently used ("MFU") entry and one or more other entries where the received value is not stored as LFU entries. In some embodiments, the method includes setting, in response to determining that the received value is currently stored in an entry of the cache memory structure, the usage frequency count for a set of entries where the currently stored value is stored to a value that corresponds to how often the currently stored entry is accessed relative to one or more other entries of the set of entries.

A computer program product includes a computer readable storage medium that stores code executable by a processor. The executable code includes code to perform receiving a value to be stored in a cache memory structure. The executable code includes code to perform identifying, in response to determining that the received value is not currently stored in an entry of the cache memory structure, a least recently used ("LRU") set of entries of the cache memory structure where the received value can be stored. The LRU set of entries is identified based on a recentness value that indicates which of a plurality of predefined sets of entries for the cache memory structure is the least recently used. The executable code includes code to perform selecting a least frequently used ("LFU") entry of the identified LRU set of entries for storing the received value. The LFU entry may be selected based on a usage frequency count for the entries of the identified LRU set of entries. The usage frequency count may indicate which entry of the identified LRU set of entries is the least frequently used.

Figure 1:
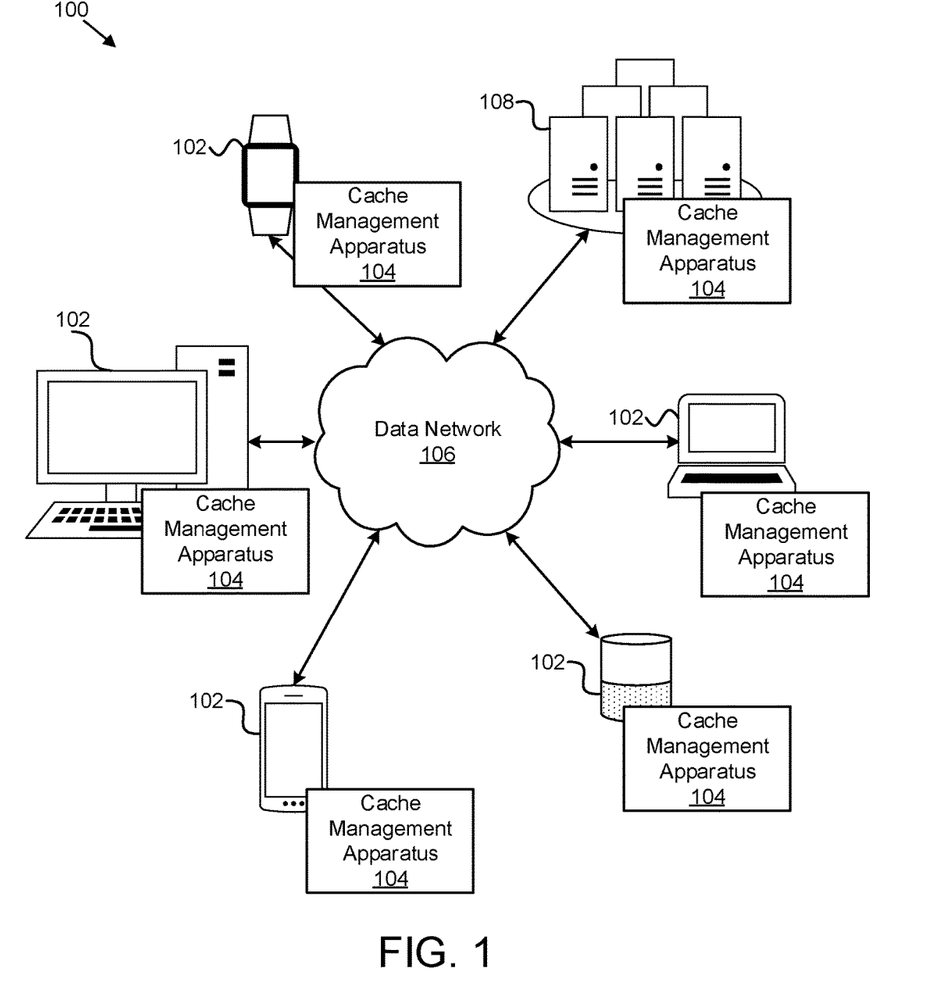
FIG. 1 is a schematic block diagram illustrating one embodiment of a system for cache replacement.

FIG. 1 is a schematic block diagram illustrating one embodiment of a system 100 for cache replacement. In one embodiment, the system 100 includes one or more information handling devices 102, one or more cache management apparatuses 104, one or more data networks 106, and one or more servers 108. In certain embodiments, even though a specific number of information handling devices 102, cache management apparatuses 104, data networks 106, and servers 108 are depicted in FIG. 1, one of skill in the art will recognize, in light of this disclosure, that any number of information handling devices 102, cache management apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may include executable code, functions, instructions, operating systems, and/or the like for managing cache memory, performing cache memory operations, and/or the like.

In one embodiment, the cache management apparatus 104 is configured to divide entries in a cache where values can be stored into a plurality of sets, e.g., a plurality of sets of pairs of entries, and then when a value is received to store in the cache, the cache management apparatus 104 is configured to determine which of the sets of entries is the least recently used ("LRU") set, and then which entry within the identified LRU set has a value that is the least frequently used ("LFU") value of the LRU set. The cache management apparatus 104, including its various sub-modules, may be located on one or more information handling devices 102 in the system 100, one or more servers 108, one or more network devices, and/or the like. The cache management apparatus 104 is described in more detail below with reference to FIGS. 3 and 4.

In one embodiment, the cache management apparatus 104 improves upon conventional cache replacement policies because may perform better on more types of workloads than conventional cache replacement policies such as replacing entries that are solely the least recently used, solely the least frequently used, and/or the like. For instance, LRU policies replace an entry in a cache if the entry has not been accessed for the longest amount of time. LFU policies replace an entry in a cache if the entry has been referenced the fewest number of time. Some workloads perform well when using LRU policies, and some workloads perform well when using LFU policies. Thus, there may be situations where a workload that performs well using an LRU replacement policy is executing on a device that applies an LFU replacement policy such that the workload cannot execute at its optimal state. The cache management apparatus 104, however, combines features of both LRU and LFU replacement policies in such a way to ensure that the most recently used entry and the most frequently used entry in a cache will not be replaced. Consequently, this leads to a higher hit rate in the cache for various different workloads, both workloads that perform well with an LRU replacement policy and workloads that perform well with an LFU replacement policy.

In various embodiments, the cache management apparatus 104 may be embodied as a hardware appliance that can be installed or deployed on an information handling device 102, on a server 108, or elsewhere on the data network 106. In certain embodiments, the cache management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the cache management apparatus 104 may include a power interface, a wired and/or wireless network interface, a graphical interface that attaches to a display, and/or a semiconductor integrated circuit device as described below, configured to perform the functions described herein with regard to the cache management apparatus 104.

The cache management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the cache management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the cache management apparatus 104.

The semiconductor integrated circuit device or other hardware appliance of the cache management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the cache management apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT-F® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data associated with an information handling device 102, such as sensor data, context data, user-profile data, device-specific data, and/or the like.

Figure 2:
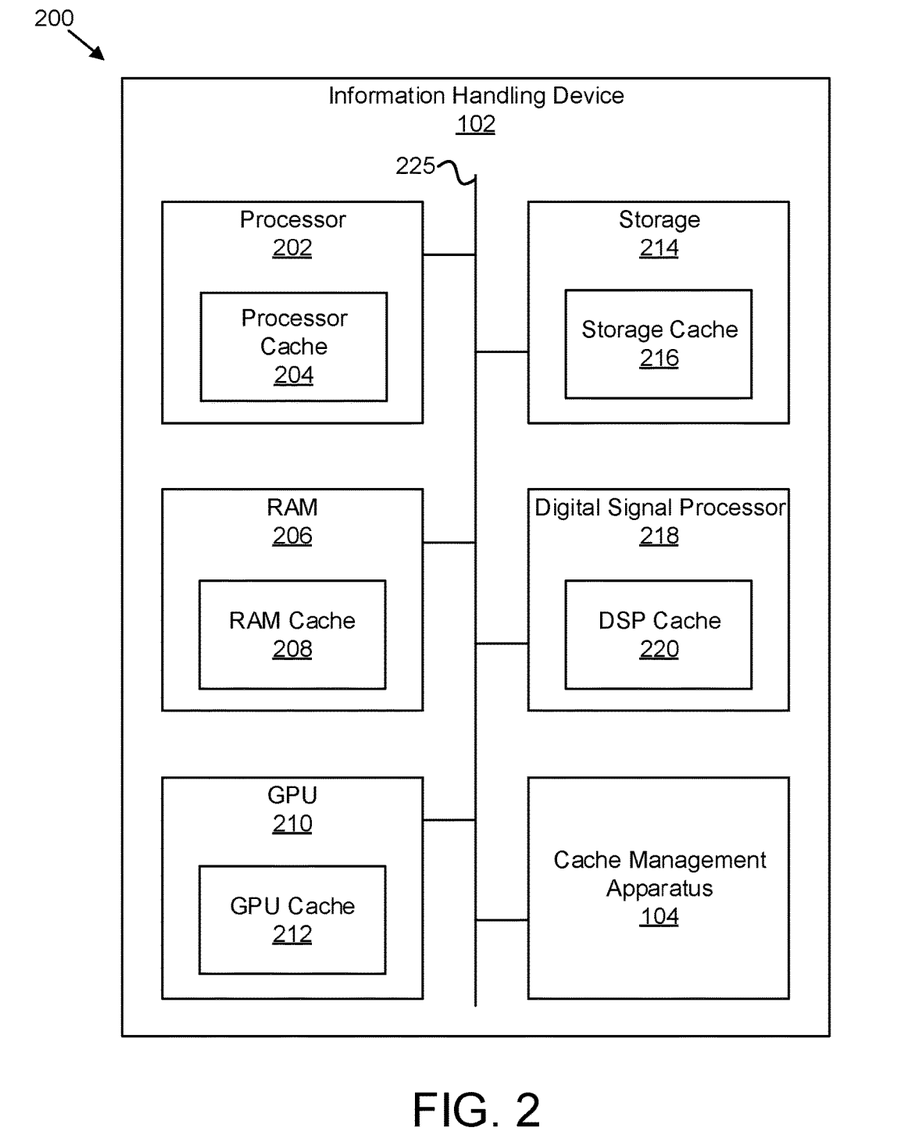
FIG. 2 is a schematic block diagram illustrating one embodiment of a computer system for cache replacement.

FIG. 2 is a schematic block diagram illustrating one embodiment of a computer system 200 for cache replacement. In one embodiment, the computer system 200 includes an information handling device 102, as described in detail above. The computer system 200 also depicts various components of the information handling device 102 that may include a cache, that may be associated with a cache, that may be communicatively coupled to a cache, and/or the like. As used herein, in one embodiment, a cache is a hardware memory component that stores data so future requests for that data can be served faster. The data stored in a cache might be the result of an earlier computation, the duplicate of data stored elsewhere, and/or the like. A cache hit occurs when the requested data can be found in a cache, while a cache miss occurs when it cannot. Cache hits are served by reading data from the cache, which is faster than re-computing a result or reading from a slower data store to service a cache miss; thus, the more requests can be served from the cache, the faster the information handling device 102 performs.

A cache replacement policy, as used herein in one embodiment, includes instructions for servicing cache requests, e.g., a cache write, when the cache is full. In other words, when a value is to be stored at an entry in the cache, but the cache is full, the cache replacement policy defines which cache entry should be selected to be replaced with the received value. There may be various conventional cache replacement policies that can be employed such as last in last out, first in first out, least recently used, least frequently used, most recently used, etc. However, none of the conventional cache replacement policies include a combination of different replacement policy features as described herein, which allows multiple different types of workloads to perform well using the replacement policy.

Referring again to FIG. 2, the various components may be communicatively coupled over a system bus 225. Furthermore, in one embodiment, the computer system 200 includes an instance of a cache management apparatus 104 that is configured to implement the cache replacement policy described herein on one or more of the various caches in the information handling device 102. For instance, the information handling device 102 may include a processor 202 that includes one or more processor caches 204, a RAM 206 that includes one or more RAM caches 208, a graphics processing unit ("GPU") 210 that includes one or more GPU caches 212, a storage device 214 that includes one or more storage caches 216, and a digital signal processor ("DSP") 218 that includes one or more DSP caches 220. One of skill in the art, in light of this disclosure will recognize other components that the information handling device 102 may include that are associated with a corresponding cache.

Figure 3:
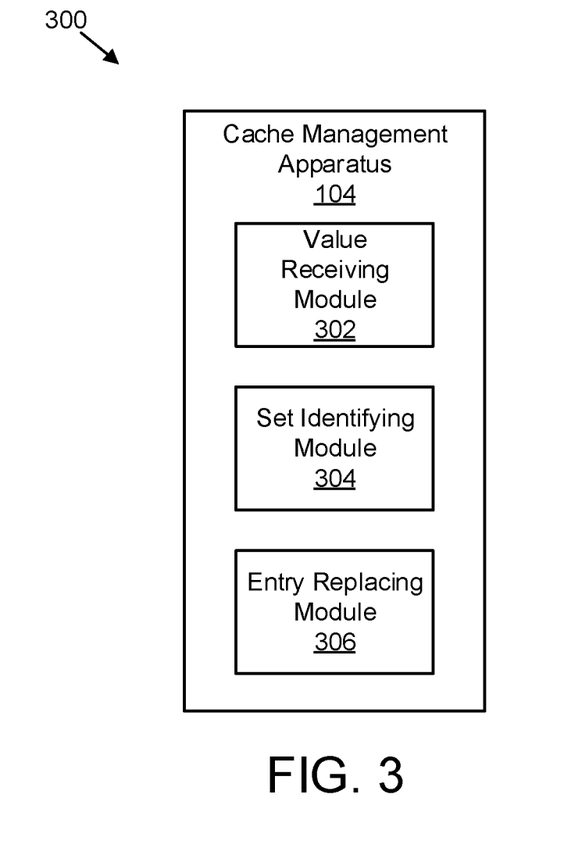
FIG. 3 is a schematic block diagram illustrating one embodiment of an apparatus for cache replacement.

FIG. 3 is a schematic block diagram illustrating one embodiment of an apparatus 300 for cache replacement. In one embodiment, the apparatus 300 includes an instance of a cache management apparatus 104. In further embodiments, the cache management apparatus 104 includes a value receiving module 302, a set identifying module 304, and an entry replacing module 306, which are described in more detail below.

The value receiving module 302, in one embodiment, is configured to receive a value to be stored in a cache memory structure. The value may be one of various types such as integers, floats, doubles, strings, characters, and/or the like. The value receiving module 302 may receive the value in response to an application requesting the value from the cache, an application providing the value to the cache, e.g., from a non-volatile storage device, and/or the like. For instance, an application may execute one or more instructions that requires a previously computed or stored value. The application may first query the cache for the value. If the value is found in the cache, the value is returned to the application from the cache, e.g., a cache hit. Otherwise, if the value is not in the cache, e.g., a cache miss, then the value may be calculated and stored in the cache, may be retrieved from a persistent storage device and stored in the cache, and/or the like. The cache memory structure may be substantially similar to any of the cache components described above with reference to FIG. 2.

The set identifying module 304, in one embodiment, is configured to identify, in response to determining that the received value is not currently stored in an entry of the cache memory structure, a least recently used ("LRU") set of entries of the cache memory structure where the received value can be stored. In certain embodiments, as described in more detail below, the entries of the cache memory structure may be logically grouped, divided, partitioned, and/or the like into one of more sets of entries. For example, an entry of the cache memory structure may be paired with another entry such that each set of entries includes two entries. Each set of entries may include more than two entries, such as 4, 8, 16, and so on. Furthermore, each set of entries may include the same number of entries, or may include different numbers of entries of the cache memory structure. As used herein, an entry may include a storage location, memory address, and/or the like that may be used for storing various values in the cache memory structure.

In certain embodiments, each set of entries is associated with a recentness value that indicates how recently an entry within the set of entries has been accessed, written to, and/or the like, which may be used to identify which set of entries of the plurality of sets of entries for the cache memory structure is the least recently used set of entries. In certain embodiments, each of the plurality of sets of entries for the cache memory structure is represented by one or more bits, e.g., LRU bits, and the recentness value includes the one or more LRU bits that represent the set of entries that is the LRU set of entries.

For example, if there are four entries in the cache memory structure, and two sets of entries that each include two entries, the LRU bits representing the sets of entries may be '0' for the first set of entries and '1' for the second set of entries. In another example, if the cache memory structure includes eight entries, and thus four sets of two entries each, the sets of entries may be represented by the bit values '00', '01', '10', and '11'. The recentness value, therefore, in one embodiment, tracks which of the sets of entries is the LRU set of entries by storing, tracking, and/or the like the bit value that represents the LRU set of entries.

The entry replacing module 306, in one embodiment, is configured to select a least frequently used ("LFU") entry of the identified LRU set of entries. The LFU entry of the LRU set of entries, in certain embodiments, is selected as the storage located for storing the received value within the LRU set of entries. In one embodiment, the LFU entry is selected based on or according to a usage frequency count for the entries of the identified LRU set of entries. In such an embodiment, the usage frequency count indicates which entry of the identified LRU set of entries is the least frequently used.

For example, if there are two entries in a particular set of entries that is identified as the LRU set of entries, the usage frequency count would indicate which of the entries of the pair of entries is the least frequently used entry. In certain embodiments, the usage frequency count for each entry of the plurality of predefined sets of entries includes one or more LFU bits indicating which entry for each set of entries is the LFU entry. For instance, if there are two entries in the LRU set, the usage frequency count may associate a bit value of '0' with the first entry and a bit value of '1' with the second entry. Accordingly, if the bit value indicates the LFU entry for the LRU set, a bit value of '0' would indicate that the first entry is the LFU entry and a bit value of 1' would indicate that the second entry is the LFU entry.

In some embodiments, multiple bits may be used to represent degrees or levels of frequency with which each entry in a set of entries is accessed. For instance, for a set of entries that includes two entries, two bits may be used to represent how often one entry is accessed relative to the other entry. In one embodiment, for example, using two bits, the usage frequency count may be encoded using the following bit values:

'11'—The first entry is referenced at least twice more than the second entry

'10'—The first entry is referenced once more than the second entry

'01'—The second entry is referenced once more than the first entry

'00'—The second entry is referenced at least twice more than the first entry

Thus, when an entry in the cache memory structure is referenced, the corresponding bits may be updated, as described below (e.g., incremented and/or decremented based on the entry that is referenced), to represent the usage frequency count for the entries within the set that includes the referenced entry, up to the max and min thresholds, e.g., up to the '11' and '00' thresholds. Various encoding schemes may be used to indicate which entry in a set is the LFU entry, and also the frequency with which an entry is referenced relative to the other entry.

In this manner, features of the LRU and LFU cache replacement may be integrated such that neither the most recently used nor the most frequently used entries are evicted from the cache.

Figure 4:
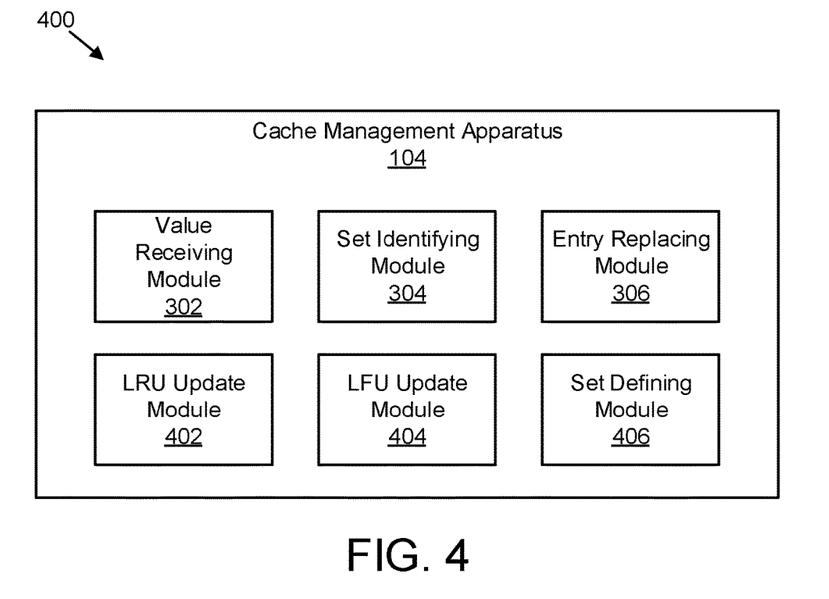
FIG. 4 is a schematic block diagram illustrating one embodiment of another apparatus for cache replacement.

FIG. 4 is a schematic block diagram illustrating one embodiment of another apparatus 400 for cache replacement. In one embodiment, the apparatus 400 includes an instance of a cache management apparatus 104. In further embodiments, the cache management apparatus 104 includes a value receiving module 302, a set identifying module 304, and an entry replacing module 306, which are substantially similar to the value receiving module 302, the set identifying module 304, and the entry replacing module 306 described above. Furthermore, in certain embodiments, the cache management apparatus 104 includes an LRU update module 402, an LFU update module 404, and a set defining module 406, which are described in more detail below.

The LRU update module 402, in one embodiment, is configured to update the one or more LRU bits that include the recentness value to identify a new LRU set of entries in response to storing the received value. For instance, if there are two sets of entries in the cache, set 0 and set 1, and if the recentness value has a bit value of '0' to indicate that set 0 is the current LRU set of entries, but the received value is stored in an entry in set 0, then the LRU update module 402 updates the recentness value to have the bit value 1' to indicate that set 1 is now the current LRU set of entries.

Similarly, LRU update module 402, in one embodiment, is configured to update the one or more LRU bits that include the recentness value to identify a new LRU replacement order, e.g., an ordering of the entry sets based on the recentness value, in response to an entry outside of the current most recently used ("MRU") set of entries being accessed, referenced, read, checked, and/or the like. For instance, if there are two sets of entries in the cache, set 0 and set 1, and if the recentness value has a bit value of '0' to indicate that set 0 is the current LRU set of entries and set 1 is the current MRU set of entries, and the received value is read from an entry in set 0, then the LRU update module 402 updates the recentness value to have the bit value 1' to indicate that set 1 is now the current LRU set of entries. However, if the received value is read from an entry in set 1, then the recentness value would not change because set 1 would remain the MRU set and set 0 would remain the LRU set.

The LFU update module 404, in one embodiment, is configured to update the one or more LFU bits of the usage frequency count for the identified LRU set of entries in response to storing the received value in the LFU entry such that the value of the one or more LFU bits corresponds to the LFU entry of the LRU set of entries. In certain embodiments, for instance, when the received value is stored in the LFU entry of the LRU entry set, the usage frequency count may be set to a value that indicates the entry that is storing the new value.

For example, in accordance with the example bit value encodings above, if the first entry is currently the most frequently referenced entry as indicated by the value '11', meaning that it has been referenced at least two more times than the second entry (e.g., at least two more references in a row or sequentially without any references to the second entry), when the received value is stored in the second entry of the LRU entry set, the LFU update module 404 may set bits of the usage frequency value to a value that corresponds to the stored received value, e.g., to the value '01'. Thus, even though the first entry had been referenced at least two more times than the second entry, because the second entry was the replaced or new entry in the LRU entry set, the usage frequency count gets "reset" to a value that indicates that the replaced value is now the more/most frequently used ('MFU') value of the pair of values in the LRU entry set.

In further embodiments, if it is determined that the received value is currently stored in the cache, e.g., in response to a previous computation or data retrieval, the LFU update module 404 is configured to update or set the usage frequency count for a set of entries where the previously stored value is stored to a value that corresponds to how often the currently stored entry is accessed relative to one or more other entries of the set of entries. Again, continuing with the example bit value encodings above, assume the first entry is currently the most frequently referenced entry as indicated by the value '10', meaning that it has been referenced once more than the second entry.

In further embodiments, if it is determined that the received value is currently stored in the cache, e.g., in response to a previous computation or data retrieval, the LFU update module 404 is configured to update or set the usage frequency count for a set of entries where the previously stored value is stored to a value that corresponds to how often the currently stored entry is accessed relative to one or more other entries of the set of entries.

For example, continuing with the example bit value encodings above, assume the first entry is currently the most frequently referenced entry as indicated by the value '10', meaning that it has been referenced once more than the second entry. If the received value is currently stored in the first entry of a set of entries, then the LFU update module 404 may increment the usage frequency count for the LRU set of entries to '11' to indicate that the first entry has been referenced at least two more times that the second entry. If another reference to the value that is stored in the first entry is received, the LFU update module 404, in this particular example, cannot increment the usage frequency count anymore because only two bits are being used to track the usage frequency count. Regardless, in some embodiments, it is sufficient to know that the first entry has been referenced at least twice more than the second entry. In various embodiments, if the received value is currently stored in the second entry of the LRU entry set, then the update module 404 may decrement the usage frequency count to the value '01' to indicate that the second entry has been referenced one more time than the first entry. In this manner, the usage or access frequencies of the entries in the cache memory structure can be tracked on a per-set basis.

The set defining module 406, in one embodiment, is configured to generate each of the plurality of sets of entries for the cache memory structure. In certain embodiments, the set defining module 406 randomly selects entries of the cache memory structure for generating each of the plurality of predefined sets of entries. For instance, the set defining module 406 may, at random, select entries to add to a set until each of the entries in the cache memory structure has been assigned to one set.

In further embodiments, the set defining module 406 sequentially selects entries of the cache memory structure for generating each of the plurality of predefined sets of entries. In such an embodiment, the set defining module 406 may start at the first entry in the cache memory structure and assign it to a set, and then move to the next sequential entry in the cache memory structure, and assign it to a set, and so on until each of the entries in the cache memory structure are assigned to a set.

In some embodiments, the set defining module 406, assigns entries to sets on a random basis. In such an embodiment, the set defining module 406 may select an entry to be assigned to a set, and may randomly select a set that is not yet full to assign the entry to. In other embodiments, the set defining module 406 sequentially assigns selected entries to sets. In such an embodiment, the set defining module 406 starts at set 0 and fills it with a number of entries, and then moves to set 1, and so on until entries are assigned to each of the sets.

Example Embodiment

Below is a table that illustrates an example of a 4-way set associative cache. There are four entries in the cache, Entries 0-3, which have been paired up into two sets, Sets 0 and 1. For this example, assume the recentness bit "points" to Set 0 as the set that is the least recently used. Furthermore, assume that the usage frequency count for both Sets 0 and 1 is '10' meaning that the second entries, e.g., the odd entries B and D, respectively, in each set are the LFU entries for the set, or, in other words, even entries A and C are the more frequently used entries.

| Set 0 | | Set 1 | | | | |
|---|---|---|---|---|---|---|
| Entry 0 | Entry 1 | Entry 2 | Entry 3 | Recentness | Set 0 Freq. Count | Set 1 Freq. Count |
| A | B | C | D | 0 | 10 | 10 |

If the value receiving module 302 receives the value 'A' to be stored in the cache, this would produce a cache hit because 'A' is already stored in the cache memory structure. The LRU update module 402, in one embodiment, would then check to see if the recentness bit needs to be updated to "point" to Set 1 as the new LRU set, which it does. Furthermore, the LFU update module 404 may need to update the usage frequency count for the entries in Set 0. In this instance, the current usage frequency count indicates that 'A' has been referenced once more than 'B', and therefore the LFU update module 404 can increment the usage frequency count to '11' to indicate that 'A' has been referenced at least twice more than entry 'B'. The resulting cache would be as follows:

| Set 0 | | Set 1 | | | | |
|---|---|---|---|---|---|---|
| Entry 0 | Entry 1 | Entry 2 | Entry 3 | Recentness | Set 0 Freq. Count | Set 1 Freq. Count |
| A | B | C | D | 1 | 11 | 10 |

If the value receiving module 302 receives the value 'A' again, which would produce another cache hit, nothing would change because the recentness bit already "points" to the Set 1 as the LRU entry set, and the frequency count for Set 0 is at its threshold for the number of available bits.

If the value receiving module 302 receives the value 'D', which would produce a cache hit, the LRU update module 402, in one embodiment, would check to see if the recentness bit needs to be updated to "point" to Set 0 as the new LRU set, which it does. Furthermore, the LFU update module 404 may need to update the usage frequency count for the entries in Set 1. In this instance, the current usage frequency count indicates that 'C' has been referenced once more than 'D', and therefore the LFU update module 404 can decrement the usage frequency count to '01' to indicate that TY has been referenced once more than entry 'C'. The resulting cache would be as follows:

| Set 0 | | Set 1 | | | | |
|---|---|---|---|---|---|---|
| Entry 0 | Entry 1 | Entry 2 | Entry 3 | Recentness | Set 0 Freq. Count | Set 1 Freq. Count |
| A | B | C | D | 0 | 11 | 01 |

If the value receiving module 302 receives the value 'E', which is not in the cache memory structure, this would produce a cache miss, and the cache management apparatus 104 needs to determine which entry in the cache to replace with the value 'E'. Looking first at the recentness bit, the set identifying module 304 may determine that Set 0 is the LRU entry set. The entry replacing module 306 may then check the usage frequency count for the entries in Set 0 to determine which of the two entries is the least recently used, which happens to be Entry 1 storing value Thus Set 0, Entry 1 (otherwise bit encoded as 01) would be the storage location for value 'E'.

Furthermore, the LRU update module 402 may update the recentness bit to "point" to Set 1 as the new LRU entry set. The LFU update module 404 may also need to update the usage frequency count for Set 0. In this particular instance, because there was a cache miss and a new value is being stored in an entry in Set 0, the usage frequency count is set to indicate that the new value is the more frequently used value in the set, even though value 'A' for Entry 0 was currently referenced at least twice more than Entry 1. The resulting cache would be as follows:

| Set 0 | | Set 1 | | | | |
|---|---|---|---|---|---|---|
| Entry 0 | Entry 1 | Entry 2 | Entry 3 | Recentness | Set 0 Freq. Count | Set 1 Freq. Count |
| A | E | C | D | 1 | 01 | 01 |

Figure 5:
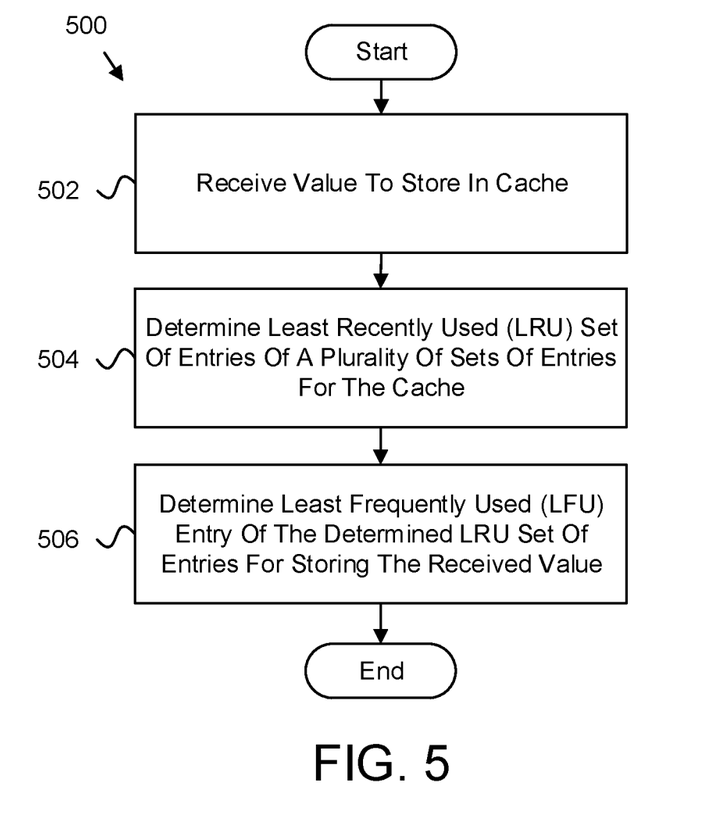
FIG. 5 is a schematic flow chart diagram illustrating one embodiment of a method for cache replacement.

FIG. 5 is a schematic flow chart diagram illustrating one embodiment of a method 500 for cache replacement. In one embodiment, the method 500 begins and receives 502a value to be stored in a cache memory structure. In further embodiments, the method 500 identifies 504, in response to determining that the received value is not currently stored in an entry of the cache memory structure, an LRU set of entries of the cache memory structure where the received value can be stored. The LRU set of entries may be identified based on a recentness value that indicates which of a plurality of predefined sets of entries for the cache memory structure is the least recently used.

In certain embodiments, the method 500 selects 506 an LFU entry of the identified LRU set of entries for storing the received value. The LFU entry may be selected based on a usage frequency count for the entries of the identified LRU set of entries. The usage frequency count may indicate which entry of the identified LRU set of entries is the least frequently used, and the method 500 ends. In one embodiment, the value receiving module 302, the set identifying module 304, and the entry replacing module 306 perform the various steps of the method 500.

Figure 6:
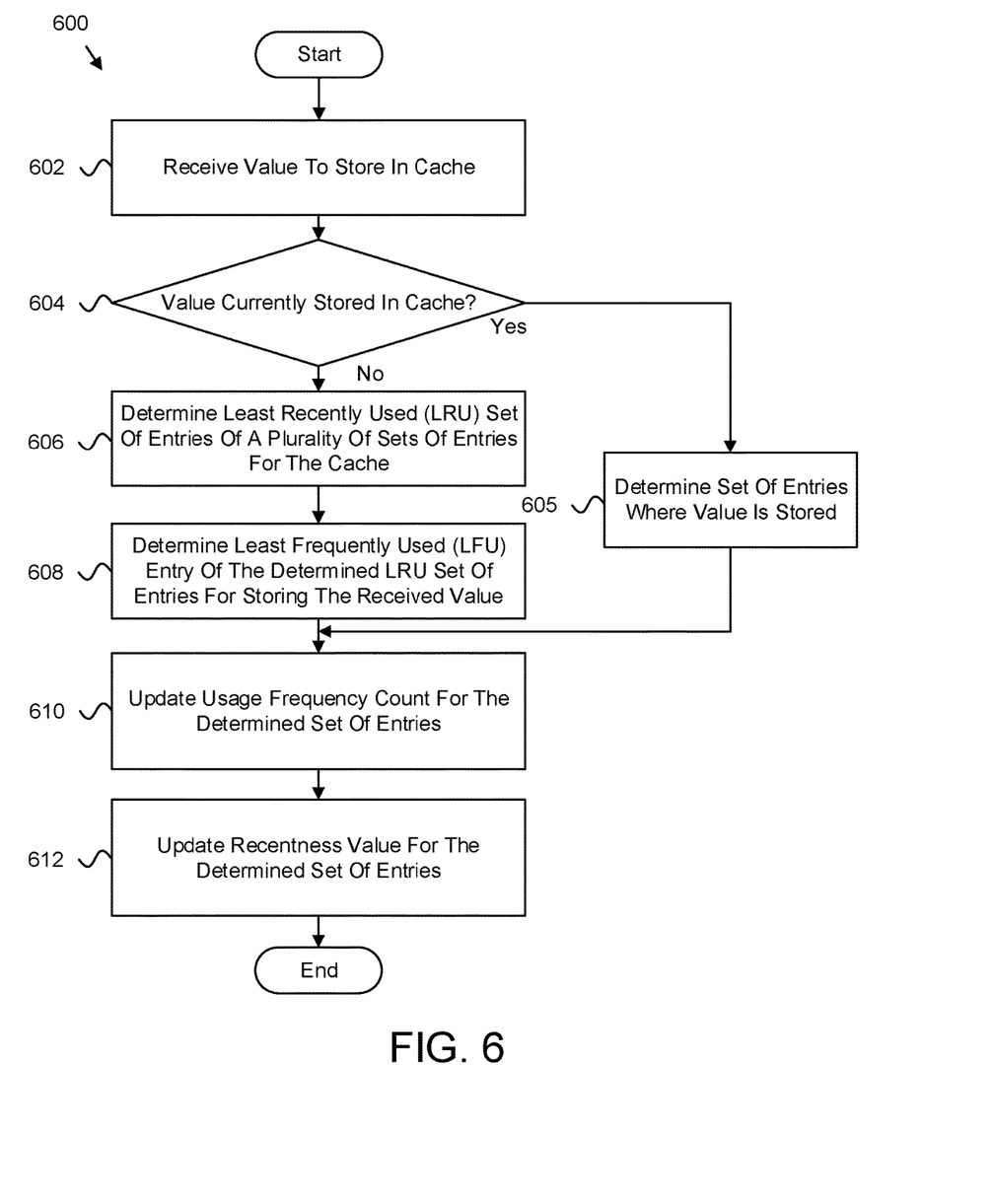
FIG. 6 is a schematic flow chart diagram illustrating one embodiment of another method for cache replacement.

FIG. 6 is a schematic flow chart diagram illustrating one embodiment of another method 600 for cache replacement. In one embodiment, the method 600 begins and receives 602 a value to be stored in a cache memory structure. In further embodiments, the method 600 determines 604 whether the received value is stored in the cache. If so, in one embodiment, the method 600 determines 605 the set of entries where the value is stored, updates 610 the usage frequency count for the determined set of entries, updates 612 the recentness value to indicate that the set of entries where the value was stored is not the LRU entry set, and the method 600 ends.

Otherwise, in some embodiments, if the value is not currently stored in the cache memory structure, the method 600 determines 606 an LRU set of entries of the cache memory structure where the received value can be stored. The LRU set of entries may be identified based on a recentness value that indicates which of a plurality of predefined sets of entries for the cache memory structure is the least recently used. In various embodiments, the method 600 determines 608 an LFU entry of the determined LRU set of entries for storing the received value.

The LFU entry may be selected based on a usage frequency count for the entries of the identified LRU set of entries. The usage frequency count may indicate which entry of the identified LRU set of entries is the least frequently used. In further embodiments, the method 600 updates 610 the usage frequency count for the determined set of entries, updates 612 the recentness value to indicate that the set of entries where the value was stored is not the LRU entry set, and the method 600 ends. In certain embodiments, the value receiving module 302, the set identifying module 304, the entry replacing module 306, the LRU update module 402, and the LFU update module 404 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a cache memory structure;
a processor; and
a memory that stores code executable by the processor to:
receive a value to be stored in the cache memory structure;
identify, in response to determining that the received value is not currently stored in an entry of the cache memory structure, a least recently used ("LRU") set of entries of the cache memory structure where the received value can be stored, the LRU set of entries identified based on a recentness value that indicates which of a plurality of predefined sets of entries for the cache memory structure is the least recently used; and
select a least frequently used ("LFU") entry of the identified LRU set of entries for storing the received value, the LFU entry selected based on a usage frequency count for the entries of the identified LRU set of entries, the usage frequency count indicating which entry of the identified LRU set of entries is the least frequently used.

2. The apparatus of claim 1, wherein each of the plurality of predefined sets of entries for the cache memory structure is represented by one or more LRU bits, the recentness value comprising the one or more LRU bits that represent the identified LRU set of entries.

3. The apparatus of claim 2, wherein the code is further executable by the processor to update the one or more LRU bits comprising the recentness value to identify a new LRU set of entries in response to storing the received value.

4. The apparatus of claim 2, wherein the code is further executable by the processor to update the one or more LRU bits comprising the recentness value to identify a new LRU set replacement order in response to an entry outside of the current most recently used ("MRU") set of entries being accessed.

5. The apparatus of claim 1, wherein the usage frequency count for each entry of the plurality of predefined sets of entries comprises one or more LFU bits indicating which entry for each set of entries is the LFU entry.

6. The apparatus of claim 5, wherein the code is further executable by the processor to update the one or more LFU bits of the usage frequency count for the identified LRU set of entries in response to storing the received value in the LFU entry such that the value of the one or more LFU bits corresponds to the LFU entry of the LRU set of entries.

7. The apparatus of claim 6, wherein the code is further executable by the processor to set the usage frequency count for the identified LRU set of entries to a bit value that identifies the entry where the received value is stored as a most frequently used ("MFU") entry and one or more other entries where the received value is not stored as LFU entries.

8. The apparatus of claim 1, wherein the code is further executable by the processor to set, in response to determining that the received value is currently stored in an entry of the cache memory structure, the usage frequency count for a set of entries where the currently stored value is stored to a value that corresponds to how often the currently stored entry is accessed relative to one or more other entries of the set of entries.

9. The apparatus of claim 1, wherein each of the plurality of predefined sets of entries comprises a pair of entries for storing values in the cache memory structure.

10. The apparatus of claim 1, wherein the code is further executable by the processor to one of:
randomly select entries of the cache memory structure for generating each of the plurality of predefined sets of entries; and
sequentially select entries of the cache memory structure for generating each of the plurality of predefined sets of entries.

11. The apparatus of claim 1, wherein the entries for each of the plurality of predefined sets of entries comprises memory addresses for the cache memory structure.

12. A method comprising:
receiving, by a processor, a value to be stored in a cache memory structure;
identifying, in response to determining that the received value is not currently stored in an entry of the cache memory structure, a least recently used ("LRU") set of entries of the cache memory structure where the received value can be stored, the LRU set of entries identified based on a recentness value that indicates which of a plurality of predefined sets of entries for the cache memory structure is the least recently used; and
selecting a least frequently used ("LFU") entry of the identified LRU set of entries for storing the received value, the LFU entry selected based on a usage frequency count for the entries of the identified LRU set of entries, the usage frequency count indicating which entry of the identified LRU set of entries is the least frequently used.

13. The method of claim 12, wherein each of the plurality of predefined sets of entries for the cache memory structure is represented by one or more LRU bits, the recentness value comprising the one or more LRU bits that represent the identified LRU set of entries.

14. The method of claim 13, further comprising updating the one or more LRU bits comprising the recentness value to identify a new LRU set of entries in response to storing the received value.

15. The method of claim 13, further comprising updating the one or more LRU bits comprising the recentness value to identify a new LRU set replacement order in response to an entry outside of the current most recently used ("MRU") set of entries being accessed.

16. The method of claim 12, wherein the usage frequency count for each entry of the plurality of predefined sets of entries comprises one or more LFU bits indicating which entry for each set of entries is the LFU entry.

17. The method of claim 16, further comprising updating the one or more LFU bits of the usage frequency count for the identified LRU set of entries in response to storing the received value in the LFU entry such that the value of the one or more LFU bits corresponds to the LFU entry of the LRU set of entries.

18. The method of claim 17, further comprising setting the usage frequency count for the identified LRU set of entries to a bit value that identifies the entry where the received value is stored as a most frequently used ("MFU") entry and one or more other entries where the received value is not stored as LFU entries.

19. The method of claim 12, further comprising setting, in response to determining that the received value is currently stored in an entry of the cache memory structure, the usage frequency count for a set of entries where the currently stored value is stored to a value that corresponds to how often the currently stored entry is accessed relative to one or more other entries of the set of entries.

20. A program product comprising a computer readable storage medium that stores code executable by a processor, the executable code comprising code to perform:
receiving a value to be stored in a cache memory structure;
identifying, in response to determining that the received value is not currently stored in an entry of the cache memory structure, a least recently used ("LRU") set of entries of the cache memory structure where the received value can be stored, the LRU set of entries identified based on a recentness value that indicates which of a plurality of predefined sets of entries for the cache memory structure is the least recently used; and
selecting a least frequently used ("LFU") entry of the identified LRU set of entries for storing the received value, the LFU entry selected based on a usage frequency count for the entries of the identified LRU set of entries, the usage frequency count indicating which entry of the identified LRU set of entries is the least frequently used.

* * * * *